(12) United States Patent
Giusti et al.

(10) Patent No.: US 11,123,878 B2
(45) Date of Patent: Sep. 21, 2021

(54) MICRO-ELECTRO-MECHANICAL MICRO-MANIPULATION DEVICE WITH PIEZOELECTRIC DRIVING, MOVABLE IN PLANE

(71) Applicant: STMICROELECTRONICS S.R.L., Agrate Brianza (IT)

(72) Inventors: Domenico Giusti, Caponago (IT); Lorenzo Tentori, Verano Brianza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 254 days.

(21) Appl. No.: 16/265,650

(22) Filed: Feb. 1, 2019

(65) Prior Publication Data
US 2019/0240844 A1 Aug. 8, 2019

(30) Foreign Application Priority Data
Feb. 2, 2018 (IT) .......................... 102018000002364

(51) Int. Cl.
| | |
|---|---|
| *B25J 15/00* | (2006.01) |
| *B25J 7/00* | (2006.01) |
| *B25J 9/12* | (2006.01) |
| *B25J 9/00* | (2006.01) |
| *B25J 15/08* | (2006.01) |

(52) U.S. Cl.
CPC .................. *B25J 15/00* (2013.01); *B25J 7/00* (2013.01); *B25J 9/0015* (2013.01); *B25J 9/12* (2013.01); *B25J 15/08* (2013.01)

(58) Field of Classification Search
CPC ..... B25J 7/00; B25J 15/00; B25J 15/08; B25J 15/12; B25J 19/0015; B25J 9/12
See application file for complete search history.

(56) References Cited

U.S. PATENT DOCUMENTS

| | | | |
|---|---|---|---|
| 5,046,773 A | 9/1991 | Modesitt | |
| 6,648,389 B2 * | 11/2003 | Frey ........................... | B25J 7/00 294/86.4 |
| 7,431,364 B2 * | 10/2008 | Huang ........................ | B25J 7/00 294/100 |
| 7,489,143 B2 * | 2/2009 | Konno ........................ | B25J 7/00 269/86 |
| 8,065,920 B2 * | 11/2011 | Park ........................ | B25J 13/085 73/860 |

(Continued)

FOREIGN PATENT DOCUMENTS

| | | |
|---|---|---|
| CN | 104647347 A | 5/2015 |
| CN | 105058366 A | 11/2015 |

(Continued)

*Primary Examiner* — Dean J Kramer
(74) *Attorney, Agent, or Firm* — Seed IP Law Group LLP

(57) ABSTRACT

A MEMS manipulation device has first and second manipulation arms carrying respective mutually facing gripping elements. At least the first manipulation arm is formed by a driving arm and by an articulated arm hinged together through an articulation structure. The first driving arm includes a first beam element and a first piezoelectric region on the first beam element. The first articulation structure includes a first connecting element not deformable in the thickness direction, as well as a first hinge structure interposed between the first driving arm, the first articulated arm, and the first connecting element.

22 Claims, 10 Drawing Sheets

(56) References Cited

U.S. PATENT DOCUMENTS

| | | | |
|---|---|---|---|
| 8,317,245 B2* | 11/2012 | Sun | B25J 9/104 |
| | | | 294/86.4 |
| 8,657,962 B2* | 2/2014 | Hayashi | B25J 7/00 |
| | | | 134/6 |
| 8,922,094 B2* | 12/2014 | Lopez | G01N 21/658 |
| | | | 310/309 |
| 8,979,149 B2 | 3/2015 | Sun et al. | |
| 9,180,594 B2* | 11/2015 | Heriban | B25J 15/0253 |
| 2005/0146248 A1 | 7/2005 | Moler et al. | |
| 2007/0024715 A1 | 2/2007 | Hirasawa et al. | |
| 2014/0265731 A1 | 9/2014 | Storm et al. | |
| 2015/0198801 A1 | 7/2015 | Naono | |
| 2016/0195893 A1 | 7/2016 | Hilt | |
| 2017/0155038 A1 | 6/2017 | Caraveo et al. | |
| 2018/0190895 A1 | 7/2018 | Giusti et al. | |

FOREIGN PATENT DOCUMENTS

| | | |
|---|---|---|
| DE | 19523229 A1 | 1/1997 |
| DE | 10107402 A1 | 8/2002 |
| EP | 0441060 A2 | 8/1991 |
| JP | H0890478 A | 4/1996 |
| WO | 2010/094102 A1 | 8/2010 |

* cited by examiner

MICRO-ELECTRO-MECHANICAL MICRO-MANIPULATION DEVICE WITH PIEZOELECTRIC DRIVING, MOVABLE IN PLANE

BACKGROUND

Technical Field

This disclosure relates to a micro-electro-mechanical manipulation device with piezoelectric driving, and that is movable in plane.

Description of the Related Art

Micromanipulation devices are known. They can operate in either contact or contactless mode and are based upon various physical principles, being for example, of an optical type, an electrostatic type, a fluidostatic type (based upon Bernoulli's theorem), an ultrasound type, and/or a magnetic type. Each type has characteristics that enable advantageous use thereof in particular conditions, but not in other conditions. However, none of the types are completely satisfactory in regard to the capacity for handling very small objects, on the order of microns, of various dimensions, in a simple way, with high precision, and at a low cost. This is desirable, for example, in microelectronic applications, in the fields of materials science, biology, and tissue engineering (e.g., in micromanipulation of molecules, human tissue, and biological parts).

On the other hand, the tendency towards miniaturization of products, such as micro-electro-mechanical systems (MEMS) that can be obtained with semiconductor technology, has stimulated an extensive research into techniques for micromanipulation and assembly. In particular, the development of miniaturized systems for handling and assembling micro-objects has become a major challenge for future precision engineering.

Micromanipulators using MEMS technology based upon an electrostatic-actuation principle have thus been proposed. However, even MEMS micromanipulators do not completely meet the requirements existing in certain applications. In fact, the electrostatic force that can be obtained with these devices can be considered to be weak. Consequently, to obtain sufficient gripping forces, known micromanipulators are supplied at high DC voltages, on the order of 100-200 V, which cannot be easily achieved, and are in any case far higher than the voltages normally used in integrated circuits. Moreover, the proposed MEMS micromanipulators are not easy to use for manipulating objects and/or particles immersed in a liquid. In fact, in this type of device, it is not simple to form electrically insulating layers that completely surround the arms of the manipulator; thus the risk of electrical discharges exists. To reduce this problem, the arms of the manipulator are frequently designed to have a considerable length in order to allow electrical insulation of the portions controlling the movement with respect to gripping ends of the arms. This design, however, reduces the gripping precision, in addition to increasing the overall dimensions of the device, and does not in any case always ensure electrical insulation. DE 195 23 229 discloses a micromanipulator that is not integrated, having a piezotranslator forming a monomorph actuator that varies in length when electrically biased and is glued head-by-head to the gripping structure of semiconductor material. DE 101 07 402 discloses an improvement of DE 195 23 229 able to grip round objects. JP H8 90478 and CN 104 7647 347 disclose analogous microgrips that require assembling operations of parts and are not manufactured in a monolithic way.

Italian patent application No. 102016000132144 filed on Dec. 29, 2016 (corresponding to European Patent Application No. 17177446.6 and to United States Patent Application Publication No. 2018/0190895, incorporated by reference) describes a micro-actuator of piezoelectric type formed by a beam element of semiconductor material and by a piezoelectric region extending thereon. One end of the beam element is fixed, and the other end is connected to a hinge element of a constraint structure that is non-deformable in a direction of thickness of the beam. As explained in detail in this patent application, since the constraint structure is non-deformable in the thickness direction and by virtue of the hinge element, application of a voltage to the piezoelectric region causes a deformation of the beam element practically only in its plane of extension.

The micro-actuator described in the above patent application is very advantageous in so far as it may be manufactured using conventional semiconductor micromanufacturing techniques, thus at reduced costs, in a highly controllable and reliable way.

It is thus desirable to apply a similar operating principle to a micro-manipulator of the type considered herein.

There is a need in the art for a micro-manipulator that may be manufactured using MEMS technology and based upon a piezoelectric operating principle, that is thus inexpensive, reliable, easy to control, and affords considerable freedom of design to the person skilled in the art.

BRIEF SUMMARY

A manipulation device of a MEMS type includes a substrate, a first manipulation arm, a first gripping element carried by the first manipulation arm, a second manipulation arm, and a second gripping element carried by the second manipulation arm and facing the first gripping element. The first manipulation arm includes a first driving arm and a first articulated arm each having respective first and second ends, the first end of the first driving arm being connected to the substrate and the second end of the first driving arm being articulated to the first end of the first articulated arm through a first articulation structure. The first driving arm includes a first beam element and a first piezoelectric region associated with the first beam element, the first beam element having a main extension extending in an extension plane and a thickness extending in a thickness plane perpendicular to the extension plane, the thickness of the first beam element in the thickness plane being smaller than the extension of main extension in the extension plane. The first articulation structure includes a first connecting element and a first hinge structure interposed between the first driving arm, the first articulated arm, and the first connecting element.

BRIEF DESCRIPTION OF THE DRAWINGS

For a better understanding, preferred embodiments are now described, purely by way of non-limiting example, with reference to the attached drawings, wherein.

DETAILED DESCRIPTION

FIGS. 1-4 show an embodiment of a manipulation device 1 manufactured using MEMS technology.

Figure 1:
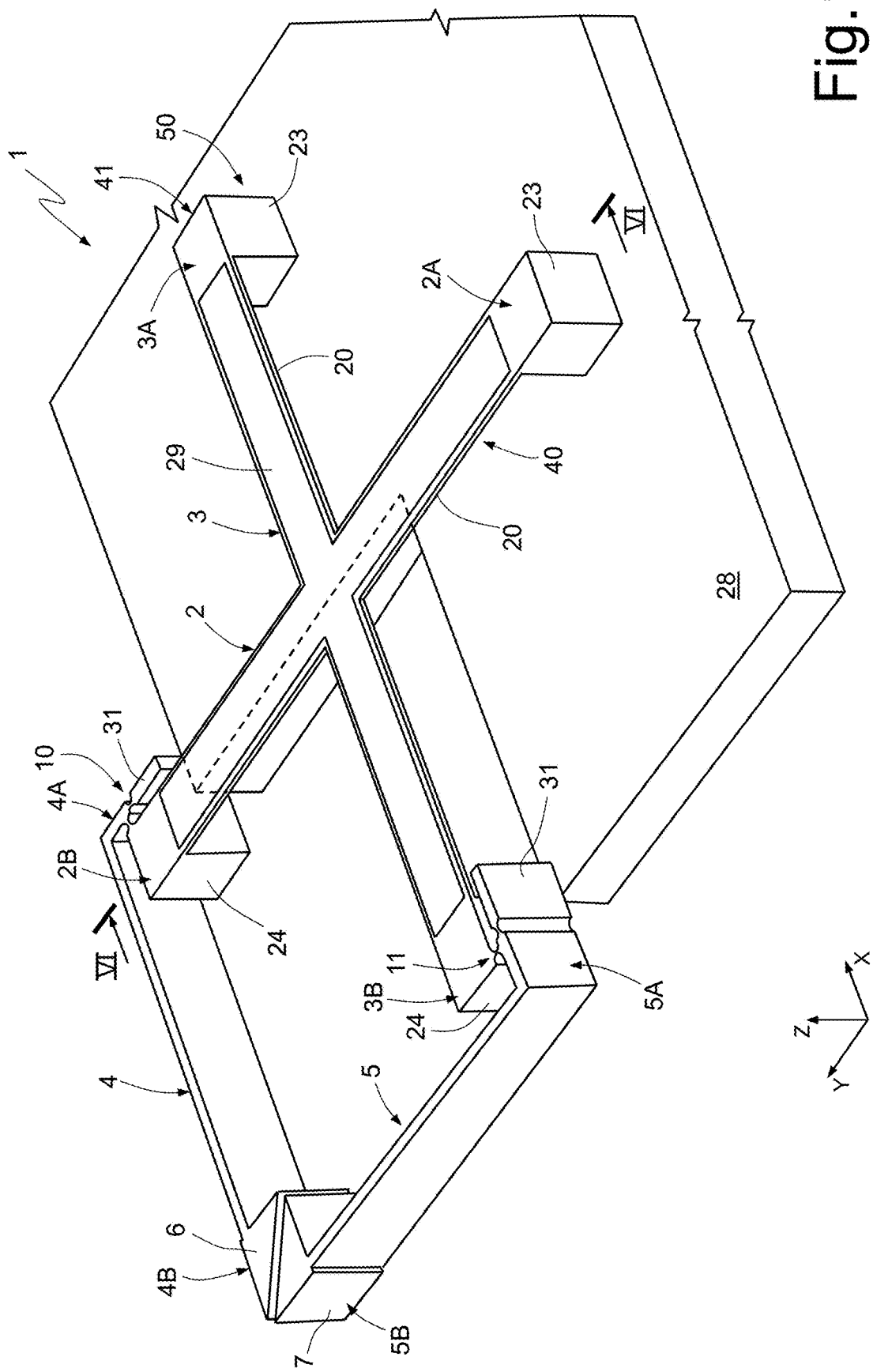
FIG. 1 is a perspective top view of an embodiment of the present manipulation device.

In detail, with reference to FIG. 1, manipulation device 1 comprises a manipulation structure 50, which is monolithic, and a substrate 28, carrying the manipulation structure 50. The manipulation structure 50 is formed by first and second manipulation arms 40, 41. The manipulation arms 40, 41 comprise first and second driving arms 2, 3 and first and second articulated arms 4, 5, respectively. The first and second articulated arms 4, 5 are elastically coupled to the first and second driving arms 2, 3, respectively, and each carries a respective gripping portion 6, 7. In particular, the first driving arm 2 has a first end 2A connected to a substrate 28, and a second end 2B articulated to a first end 4A of the first articulated arm 4. The second driving arm 3 has a first end 3A connected to the substrate 28, and a second end 3B articulated to a first end 5A of the second articulated arm 5. The articulated arms 4, 5 have second ends 4B, respectively 5B, that are widened and form the respective gripping portion 6, 7.

At rest (in the absence of biasing), the gripping portions 6, 7 face each other, at a distance. It should be noted that, in the following description, the geometrical indications, in particular in regard to directions, shapes, and mutual positions, refer to the structure of the manipulation device 1 without stresses, thus in a non-deformed condition, unless otherwise specified.

Figure 2:
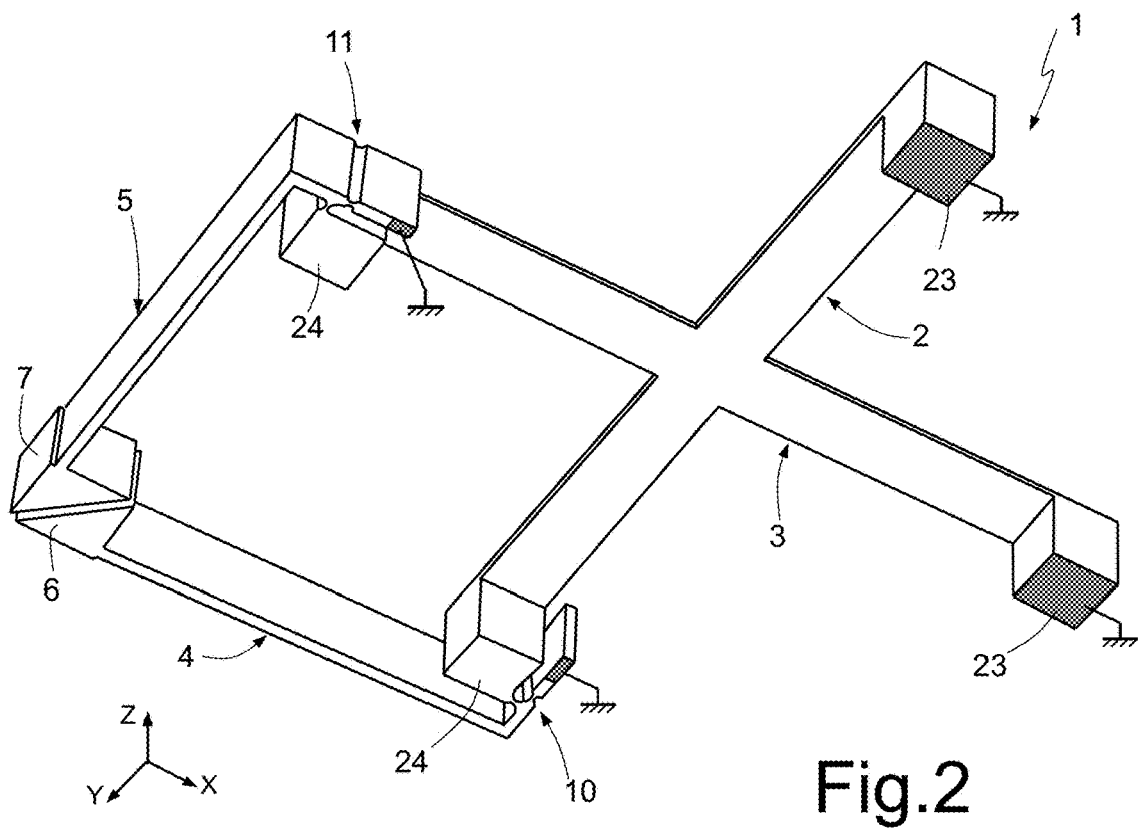
FIG. 2 is a perspective bottom view of the manipulation device of FIG. 1.

In the manipulation device 1 of FIGS. 1 and 2, the driving arms 2, 3 are arranged crossing each other at 90°, the articulated arms 4, 5 are arranged perpendicular to the respective driving arms 2, 3, and the front halves of the driving arms 2, 3 (close to the second ends 2B, 3B) form a suspended quadrilateral, in particular a square, with the articulated arms 4, 5. However, other configurations are possible, as discussed hereinafter with reference to FIGS. 9-15.

Articulation structures 10, 11 are arranged between the second end 2B, 3B of each driving arm 2, 3 and the first end 4A, 5A of the respective articulated arms 4, 5 and substantially enable a rotation of the articulated arms 4, 5 about vertical axes, perpendicular to the lying plane of the manipulation device, as described below. The driving arms 2, 3, the articulated arms 4, 5, the gripping portions 6, 7, the articulation structures 10, 11, and the substrate 28 are formed in a single semiconductor body (i.e., they are monolithic), as explained hereinafter with reference to FIGS. 6A and 6B.

In detail, each driving arm 2, 3 is formed substantially by a beam 20 (as illustrated also in FIGS. 6A, 6B), fixed with respect to a first and to a second pillars 23 and 24.

Each driving arm 2, 3 has a reduced thickness (in a vertical direction parallel to an axis Z of a Cartesian reference system XYZ) and a main extension (longitudinal direction) parallel to a respective axis (Y for the first driving arm 2 and X for the second driving arm 3) of the Cartesian reference system XYZ, even though the longitudinal directions of the driving arms 2, 3 could form an angle other than 90° or not be rectilinear, as mentioned above and illustrated in FIGS. 11-13.

Figure 6A:
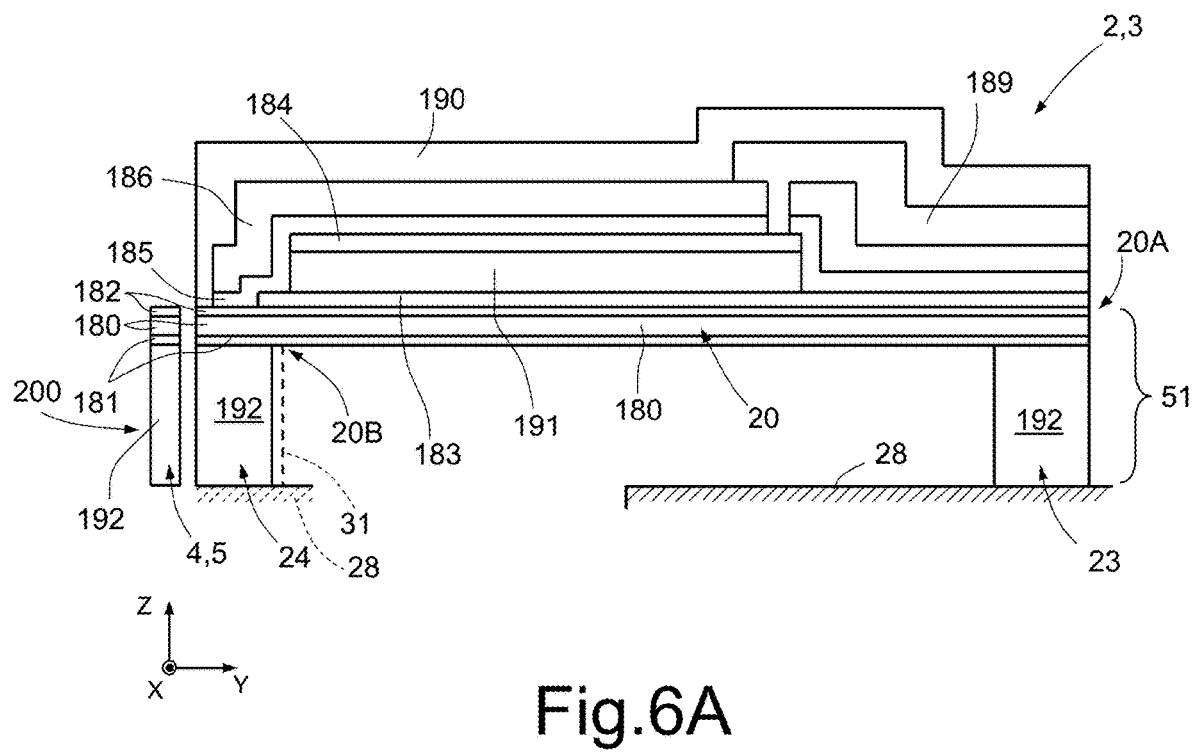
FIG. 6A is a cross-section taken along plane VI-VI of FIG. 1.
Figure 6B:
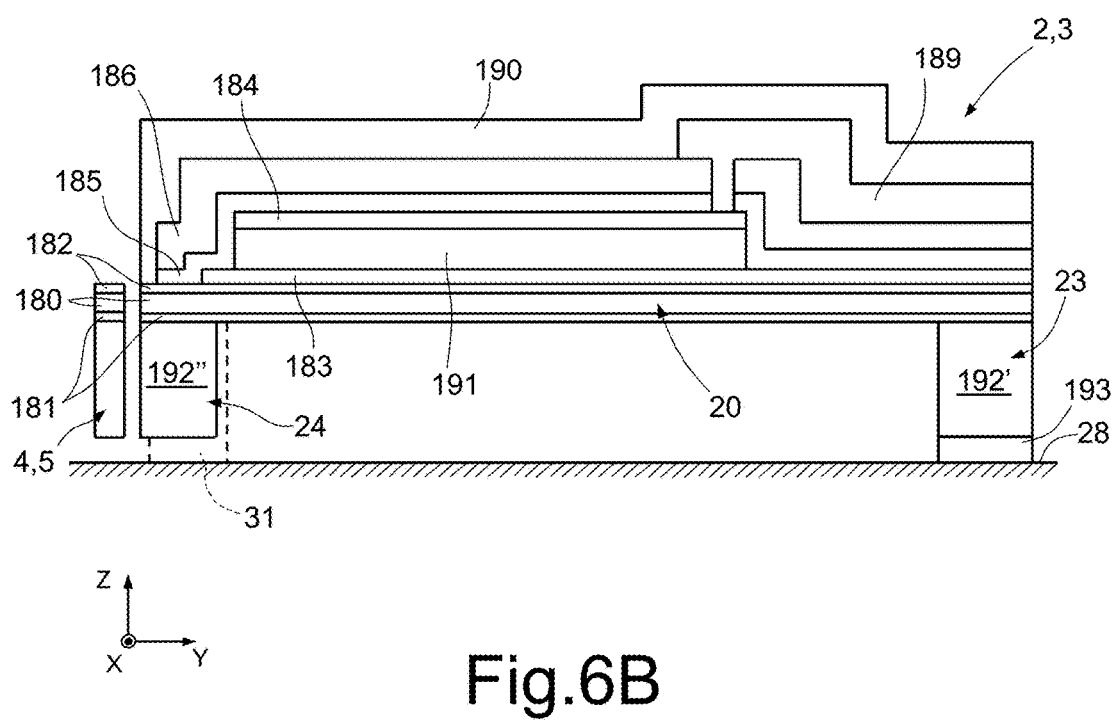
FIG. 6B shows a variant of FIG. 6A.

The first ends 2A, 3A of the driving arms 2, 3 are connected to the substrate 28 by the respective first pillars 23 (see also FIGS. 6A and 6B). The first pillars 23 extend in a transverse direction to the respective driving arm 2, 3, in a parallel direction to the axis Z of the Cartesian reference system XYZ, between the respective first ends 2A, 3A of the driving arms 2, 3 and the substrate 28, and are fixed with respect to them.

Each second pillar 24 extends from the second end 2B, 3B of the respective driving arms 2, 3 in a parallel direction to axis Z, is not connected to the substrate 28 and is thus mobile with respect to the latter. Here, the second pillars 24 have a height (in direction Z) that is the same as the first pillars 23, and the substrate 28 (for example, of monocrystalline silicon) is removed underneath the second pillars 24, the articulated arms 4, 5, and the gripping portions 6, 7.

For instance, the driving arms 2, 3 may have a thickness (in direction Z) of 3-20 μm, a length (in direction Y and, respectively, in direction X) of approximately 200-1000 μm, and a width (in a direction perpendicular to the length and to the thickness) of 40-100 μm; the pillars 23 and 24 may have a height of approximately 50-400 μm.

A piezoelectric strip 29 extends over the beams 20, and is for example, of PZT (Pb, Zr, TiO$_3$), and has a thickness, for example, of 0.2-4 μm. The piezoelectric strip 29 covers almost the entire top surface of the beams 20 and thus is also cross-shaped. The arms of the piezoelectric strip 29 have an extension (width and length) slightly smaller than the width and length of the beams 20.

Figure 3:
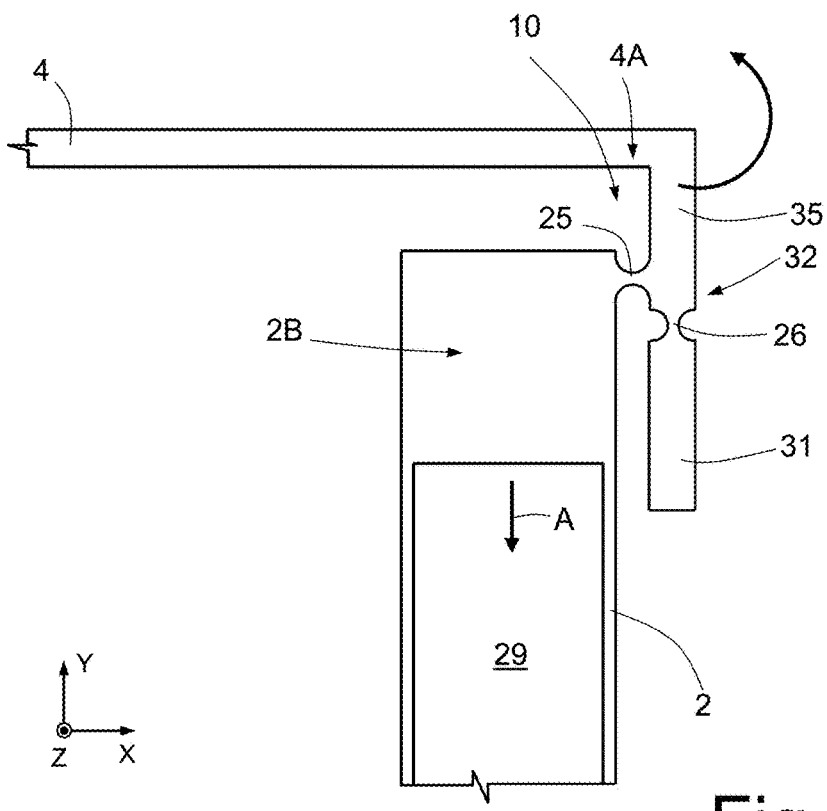
FIG. 3 is a top plan view of a detail of the manipulation device of FIG. 1.

Each articulation structure 10, 11 comprises a constraint arm 31 and a hinge structure 32 formed by and second hinges 25, 26, as illustrated in particular in the enlarged detail of FIG. 3 for the first articulation structure 10 interposed between the second end 3B of the first driving arm 2 and the first end 4A of the first articulated arm 4. Thus, hereinafter only the first articulation structure 10 will be described in detail; the second articulation structure 11 is made in the same way, but (in top plan view) is mirrored with respect to an axis at 45° with respect to axes X and Y of the Cartesian system XYZ, as may be seen in FIGS. 1 and 2.

In detail, the constraint arm 31 is formed by a vertical wall extending parallel to the respective driving arm (parallel to plane YZ for the first driving arm 2), on the side of the first driving arm 2 not facing the gripping portions 6, 7 (external to the quadrilateral formed by the driving arms 2, 3 and by the articulated arms 4, 5). The constraint arm 31 is connected to an angled stretch 35 of the first articulated arm 4 through the second hinge 26; the constraint arm 31 is moreover connected to the second end 2B of the first driving arm 2 through both of the hinges 25, 26. The constraint arm 31 has a much shorter length than the first driving arm 2 and is anchored to the substrate 28, on part of its length (in a direction Y), e.g., approximately one half of the length, as illustrated in FIG. 2, where the base area of the anchored portion of the constraint arms 31 is represented in grey. The constraint arm 31 has the same height as the pillars 23, 24. Moreover, in the embodiment illustrated, the constraint arm 31 has a width smaller than that of the beam 20, for example, of 10-50 μm.

In FIGS. 1-5, the constraint arm 31 extends parallel and as a prolongation of the angled stretch 35 of the first articulated arm 4. However, the arrangement referred to above of the constraint arm 31, parallel to the first driving arm 2, is not essential, and the constraint arm 31 could have any shape, such as a shape that is not elongated.

The angled stretch 35 here extends perpendicular to the first articulated arm 4 from the first end 4A of the latter and is connected to the second end 2B of the first driving arm 2 via the first hinge 25.

The hinges 25, 26 are formed by portions having a smaller width than the first driving arm 2 and of the constraint arm 31. In detail, the first hinge 25 extends between the second end 2B of the first driving arm 2 and the angled stretch 35 and thus represents a connection portion here extending perpendicular to the first driving arm 2, the angled stretch 35, and the constraint arm 31. The second hinge 26 extends between the angled stretch 35 and the constraint arm 31 and thus represents a connection portion extending parallel to the angled stretch 35, the constraint arm 31, and the first driving arm 2.

For instance, in their point of minimum width, the hinges 25, 26 may have a width of 2-50 µm; however, in general, this width depends upon the desired stiffness of the constraint structures 10, 11.

Both the hinges 25, 26 have a height (in direction Z) equal to the second pillar 24, the constraint arm 31, and the angled stretch 35 and are not connected to the substrate 28.

With this structure, by virtue of the large thickness and small width of the constraint arm 31 and the of hinge structure 32, these are substantially rigid in a vertical direction (direction of axis Z), but are compliant in the extension plane XY of the beams 20 so as to allow rotation of the articulated arms 4, 5 with the respective gripping portions 6, 7 about the articulation structures 10, 11.

In particular, and as explained in detail in aforementioned United States Patent Application Publication No. 2018/0190895 (incorporated by reference), when the strips of piezoelectric material 29 are not biased, the manipulation device 1 is in its rest configuration, illustrated in FIGS. 1-3, 4A (and 4B with dashed line). When the strips of piezoelectric material 29 are biased by applying a voltage (e.g., 30-40 V), they shrink and cause rotation of the second ends 2B, 3B of the driving arms 2, 3 and of the articulated arms 4, 5 in the plane XY, about substantially vertical axes and in opposite directions (in a counterclockwise direction for the first driving arm 2 and in a clockwise direction for the second driving arm 3—FIGS. 4B and 5).

In fact, the first ends 2A, 3A of the driving arms 2, 3 are connected to the substrate 28 through the first pillars 23 (and thus, to a first approximation, do not have any degree of freedom). Instead, the second ends 2B, 3B are connected in a direction Z by the constraint arms 31 (and are thus not free to deflect in this direction), but can move in the plane XY by virtue of the presence of the hinge structures 32, which provide (to a first approximation) an (angular) degree of freedom in the plane XY.

Figure 4A:
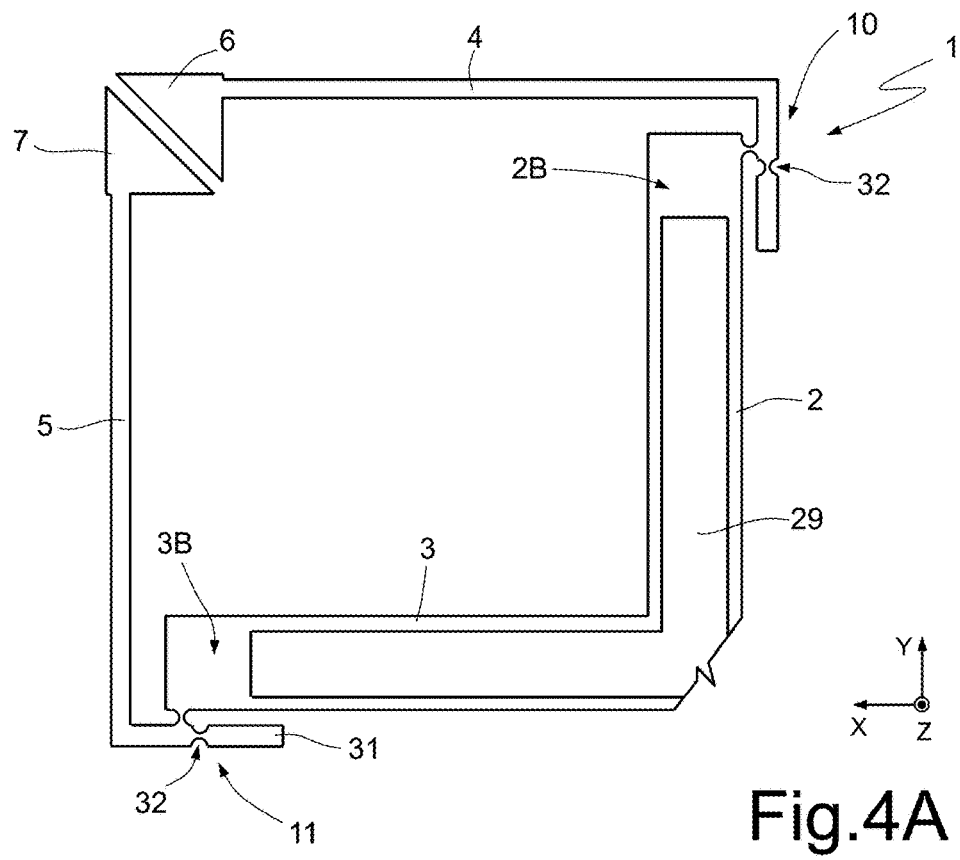
FIGS. 4A and 4B are top plan views, partially interrupted, of the manipulation device of FIG. 1 in a non-stressed position and in a stressed position, respectively.
Figure 4B:
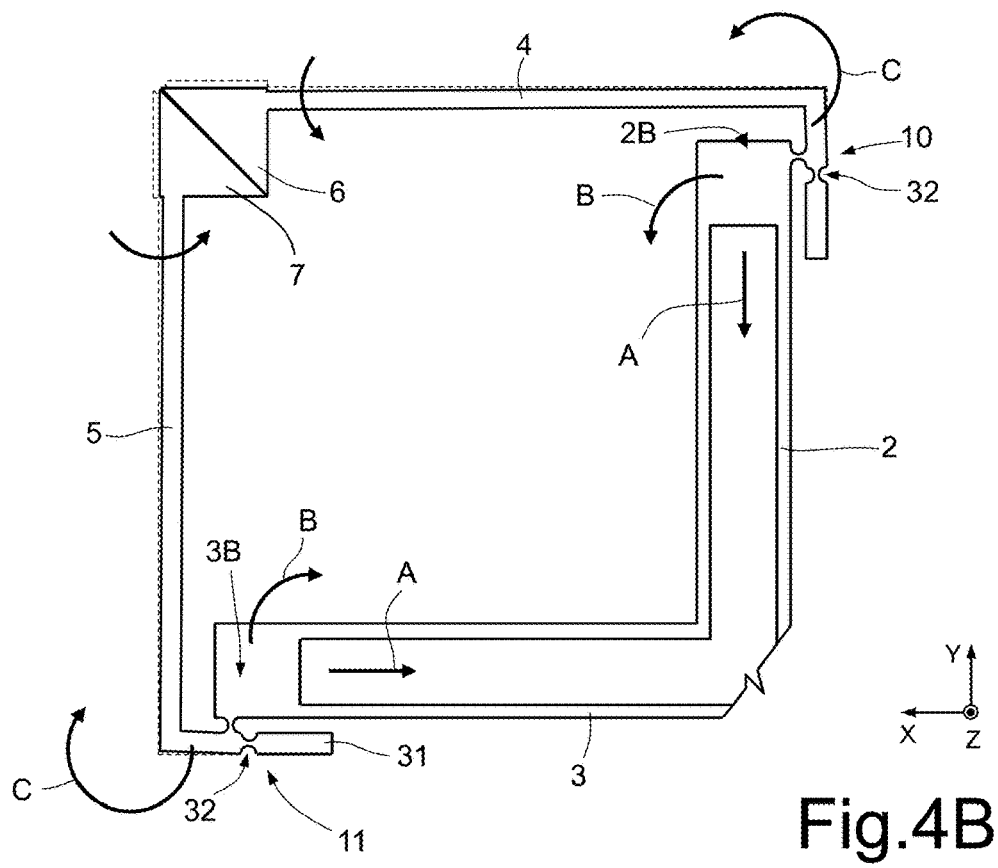
Figure 5:
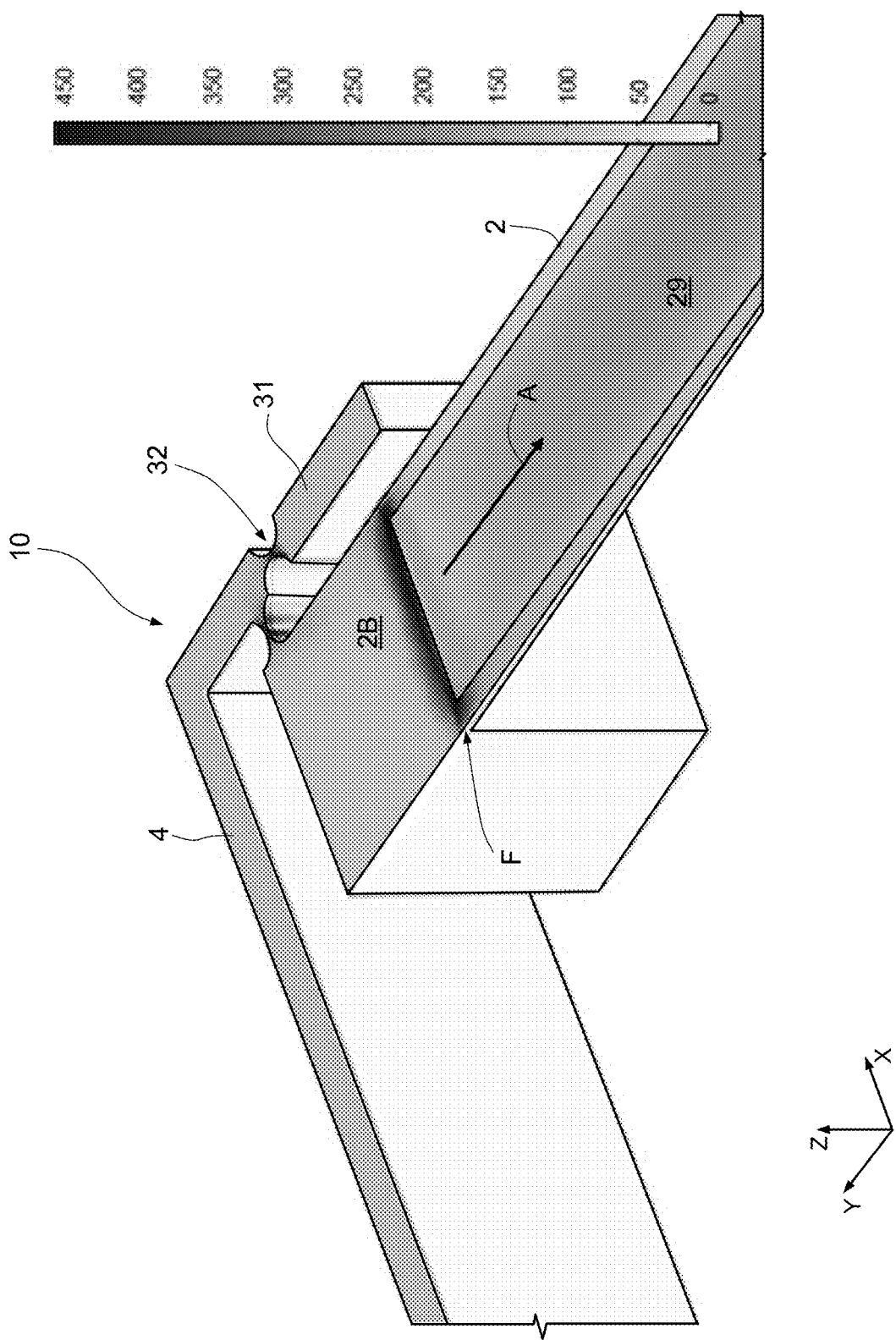
FIG. 5 is a simulation of the stresses in a portion of the manipulation device of FIG. 1.

In practice, shrinkage of the beams 20 generates forces (as indicated by the arrows A in FIGS. 4B and 5) that "pull" the second ends 2B, 3B of the driving arms 2, 3 towards the respective first ends 2A, 3A and cause rotation of the second ends 2B, 3B in opposite directions (as represented in FIG. 4B with dashed lines and indicated by the arrows B). Rotation of the second ends 2B, 3B of the driving arms 2, 3 causes a corresponding rotation of the articulated arms 4, 5, which also rotate in the plane XY, amplifying the movement and bringing the gripping portions 6, 7 closer to each other (FIG. 4B, arrows C). FIG. 5 shows in shades of grey the distribution of the stresses. As may be noted, the stresses are concentrated in the areas of the hinges 25, 26 and in the area of the beam 20 where this is connected to the second pillar 24 (indicated by the arrow F), areas that thus undergo deformation, as explained above.

The gripping portions 6, 7 can then grip possible objects, materials, and structures in the space between them, at rest, and keep them in a fixed position during subsequent activities (e.g., of analysis) or displace them into other spatial positions when the manipulation device 1 is associated to, or comprises a spatial-displacement mechanism.

The beams 20 and the piezoelectric strips 29 may be manufactured in a way similar to what described in the United States Patent Application Publication No. 2018/0190895 (incorporated by reference), according to FIGS. 6A and 6B.

In these figures, the manipulation structure 50 is formed in a monolithic body 51 comprising a structural layer 200, a supporting layer 180 and a thin-film piezoelectric layer 191; the articulated arms 4, 5, the gripping portions 6, 7 and the articulation structures 10, 11 are formed by portions of the structural layer 200, in case overlaid by portions of the supporting layer 180; the beams 20 are formed by the supporting layer 180 carrying the thin-film piezoelectric layer 191 and the structural layer 200 is removed, except for at the ends (where are the pillars 23, 24). The pillars 23, 24, the articulated arms 4, 5, the gripping portions 6, 7 and the articulation structures 10, 11 have thus, in a first approximation, the same thickness (in the direction Z).

In detail (FIG. 6A), each beam 20 is formed by the supporting layer 180, of semiconductor material, such as epitaxially grown silicon, coated on the bottom by a bottom insulating layer 181 and on the top by a top insulating layer 182, for example, both of thermally grown silicon oxide. A stack extends over the top insulating layer 182 and is formed by a bottom electrode 183, of electrically conductive material, for example, titanium (Ti) or platinum (Pt); the thin-film piezoelectric layer 191; a top electrode 184, for example, of TiW; first and second dielectric layers 185, 186, for example of silicon oxide and silicon nitride deposited by CVD (Chemical Vapor Deposition); a contact line 189 of conductive material, for example aluminum and/or copper; and a passivation layer 190, for example of silicon oxide and/or silicon nitride deposited by CVD.

Each beam 20 has a first end 20A and a second end 20B, corresponding, respectively, to the first ends 2A, 3A of the driving arms 2, 3 and to the second ends 2B, 3B of the driving arms 2, 3 and fixed with respect to the pillars 23, 24.

In the embodiment of FIG. 6A, the first and second pillars 23, 24 have a same height and comprise respective portions 192 of the structural layer 200, preferably of semiconductor material, such as silicon, overlaid by respective portions of the bottom insulating layer 181, the supporting layer 180, and the top insulating layer 182.

The first pillar 23 may have a wide area, with portions (not illustrated) for the pads (contact pads) and possible other structures necessary for electrical connections with the electrodes 183, 184, as should be clear to the person skilled in the art.

In this embodiment, the articulated arms 4, 5 (the cross-section whereof is visible), the articulation structures 10, 11 (only part of a constraint arm 31 whereof is illustrated with a dashed line) and the gripping portions 6, 7 (not visible in FIG. 6A) are formed by the portions 192 of the structural layer 200 that also forms the pillars 23, 24, possibly overlaid by respective portions of the bottom insulating layer 181, the supporting layer 180, and the top insulating layer 182; thereby they have the same thickness (in the direction Z) as the pillars 23, 24. The substrate 28 may be formed in a separate semiconductor body, for example obtained from a first wafer worked separately from a second wafer forming the monolithic body 51 and integrating the driving arms 2, 3, the articulated arms 4, 5, the gripping portions 6, 7, and the articulation structure 10, 11, and subsequently bonded.

For instance, the second wafer may be a SOI (Silicon-On-Insulator) type, wherein the intermediate oxide layer is intended to form the bottom insulating layer 181 of FIG. 6B, one of the two silicon layers (e.g., the top one) is intended to form the supporting layer 180 of FIG. 6A, and the other silicon layer (in the example, the bottom one) is intended to form the portions 192 of the structural layer 200 of FIG. 6A. For instance, the second wafer is processed by thermally growing the top insulating layer 182 on the top silicon layer (supporting layer 180); depositing and patterning the layers to form the piezoelectric strips 29 and the corresponding biasing and electrical-connection structures, as well as the dielectric layers (forming regions 183, 184, 185, 186, 190 and 191 of FIG. 6B); lapping the back of the second wafer until the desired thickness for the pillars 23, 24 is reached, the hinge structures 32, the articulated arms 4, 5, and the gripping portions 6, 7, in the bottom silicon layer (structural layer 200; masking and etching the bottom silicon layer from the back to define the structure of the beams 20 from below, until reaching the bottom insulating layer 181 of FIG. 6A (in practice, forming openings that have the shape, in plan view, of the beams 20).

Simultaneously, before, or after, the first wafer is worked for selectively removing silicon. Then the first and second wafers are bonded together.

According to a different embodiment, illustrated in FIG. 6B, the first pillar 23 comprises first and second silicon portions 192', 193, bonded together, and the second pillar 24 is formed by a single silicon portion 192", formed simultaneously with and with the same thickness as the first silicon portion 192' of the first pillar 23 in the structural layer 200.

The structure of FIG. 6B may be obtained, for example, by bonding two separately processed wafers. In this case, for example, a sacrificial layer is grown on the substrate 28. The sacrificial layer is selectively removed to define through openings where the first pillars 23 and the constraint arms 31 are to be grown. An epitaxial polysilicon layer is grown on the sacrificial layer and in the openings. The epitaxial polysilicon layer is removed by lapping on the sacrificial layer and remains in the through openings, thus forming the second portion 193 of the first pillars 23 (and of the constraint arms 31).

Simultaneously, before, or after, the second wafer is processed in the same way as described above to etch the back of the beams 20 and form the piezoelectric strips 29, the respective electrical-connection structures and parts of the portions 192' and 192" of the structural layer 200. Then, the two wafers are bonded, aligning the portions 193 of the first wafer with the corresponding portions 192' and 192" (not yet completely defined) in the bottom silicon layer of the second wafer. Then geometry of FIGS. 1-5 is defined by etching the top silicon layer (supporting layer 180) as far as the bottom insulating layer 181, and the bottom insulating layer 181 and then the sacrificial oxide layer of the first wafer are removed to release the entire monolithic structure except for the first pillars 23 and the constraint arms 31 that remain fixed with respect to the substrate 28.

Before or after bonding the two wafers, the substrate 28 is selectively removed via partial sawing or via back etching using a dedicated mask.

In both cases, as indicated, the supporting layer 180 forms both the driving arms 2, 3 and, on the ends 2A, 2B, 3A, 3B thereof, it extends on the portion s 192, 192', 192" of the structural layer 200; moreover, the piezoelectric strips 29 are formed as thin films on supporting layer 180 where the latter forms the beam 20. In the shown embodiments, the supporting layer 180 and the insulating layers 181, 182 extend also on the articulation structures 10, 11, on the articulated arms 4, 5 and on the gripping elements 6, 7.

The described manipulation device 1 has numerous advantages. It enables simple and accurate manipulation of objects and structures of very small dimensions, by virtue of the in-plane movement of its gripping portions 6, 7. In particular, it enables accurate control of the applied force and the position of the gripping portions 6, 7.

The described manipulation device may be manufactured easily and at a low cost by using MEMS manufacturing techniques that enable an excellent precision and repeatability of the structure.

Since the actuation structure with piezoelectric strips 29 is protected, the present manipulation device may be used also in humid environments or immersed in liquids, without any need to provide particularly long movement arms. This further increases the precision of movement and gripping.

Figure 7:
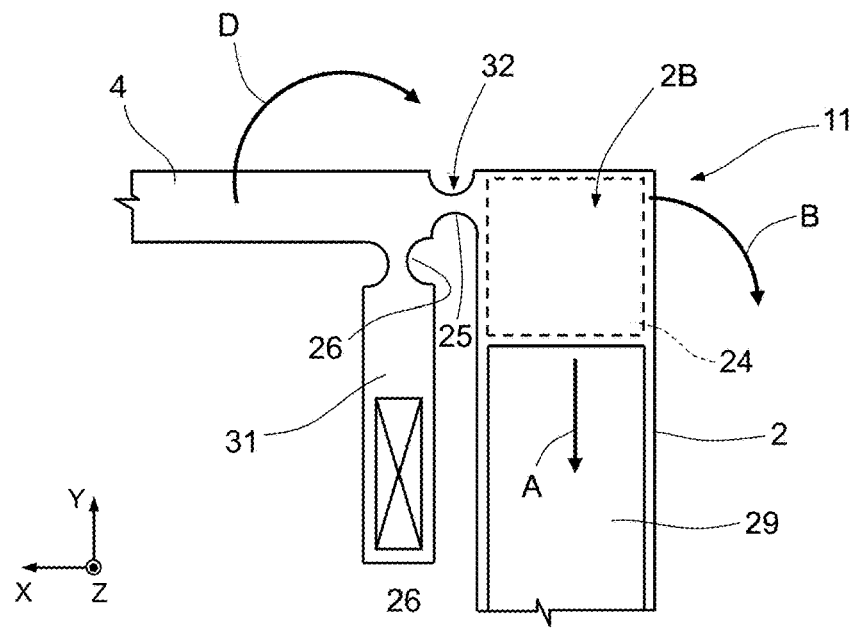
FIGS. 7 and 8 are top plan views of variants of a detail of the present manipulation device.

FIG. 7 shows an embodiment of the first articulation structure 10, wherein the constraint arm 31 is arranged within the quadrilateral formed by the driving arms 2, 3 and the articulated arms 4, 5 (whereof only part of the first arm 2 and part of the first articulated arm 5 are visible). In this case, no angled stretch is present and, when the piezoelectric strip 29 is biased, the end 2A of the first driving arm 2 turns according to arrow B, and the first articulated arm 4 turns according to arrow D, both in a counterclockwise direction (opposite to that of FIGS. 1-5). The second articulation structure 11 (not shown) is built in a similar way and arranged symmetrically with respect to an axis at 45° with respect to axes X and Y. The gripping portions 6, 7 are thus here in a normally closed position and are driven to open. In practice, the manipulation device of FIG. 7 operates as a divaricator.

Figure 8:
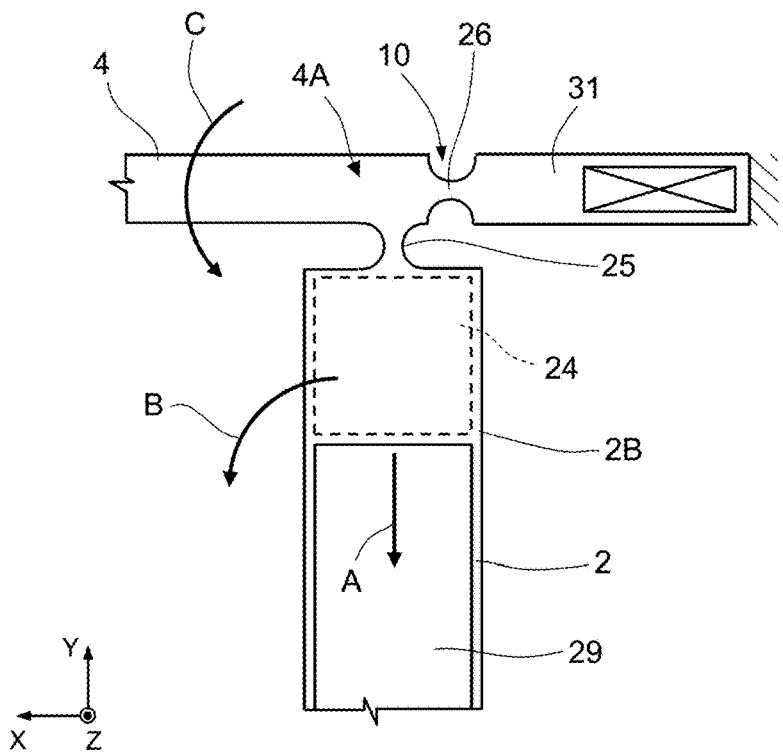

FIG. 8 shows another embodiment of the articulation structures 10, 11. In particular, with reference to the first articulation structure 10, in this embodiment, the constraint arm 31 is aligned with the first articulated arm 4 and perpendicular to the first driving arm 2; no angled stretch is present here either. The first hinge 25 is arranged longitudinally with respect to the first driving arm 2, from the front face of the second end 2B, facing the first articulated arm 4, and the second hinge 26 is formed by a reduced width portion arranged between the constraint arm 31 and the first articulated arm 4 and aligned with both. In this embodiment, as for the embodiment of FIGS. 1-5, when the piezoelectric strip 29 is biased, the first end 4A of the first articulated arm 4 turns according to the arrow C, in a counterclockwise direction.

Figure 9:
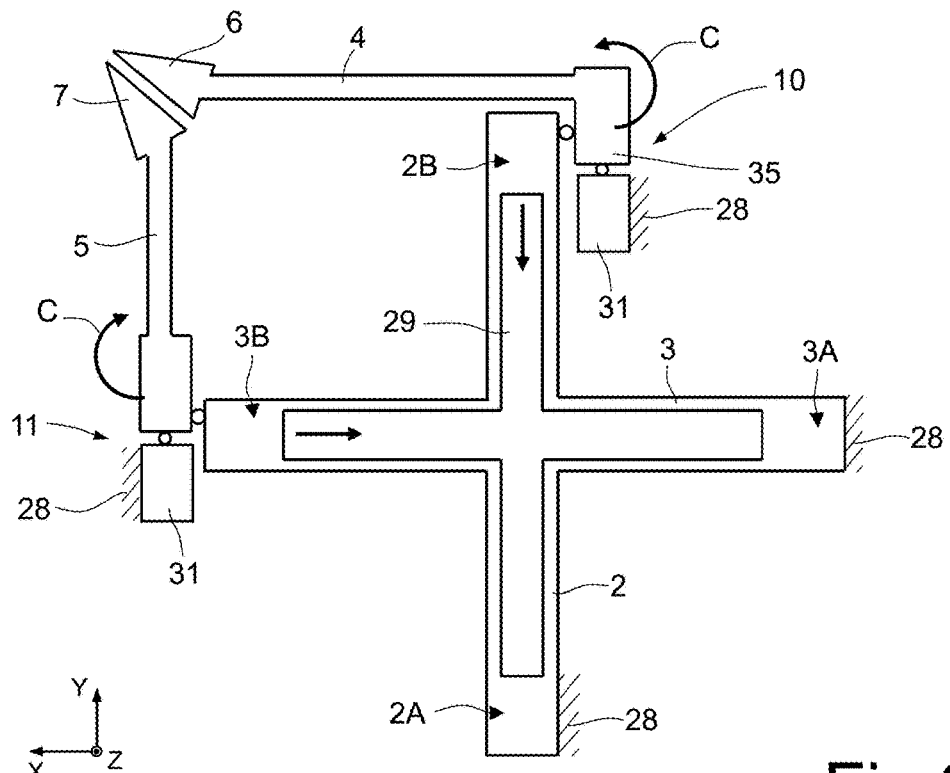
FIGS. 9-16 are top plan views of different embodiments of the present manipulation device.

FIG. 9 shows a different manipulation device, wherein the articulation structures 10, 11 are arranged asymmetrically. Specifically, the first articulation structure 10, coupled to the first driving arm 2 and to the first articulated arm 4, is formed as in FIGS. 1-5, with the constraint structure 10 laterally arranged with respect to the first driving arm 2. The second articulation structure 11, coupled to the second driving arm 3 and to the second articulated arm 5, is formed as described for FIG. 8 (for the first articulation structure 10), with the constraint structure 11 coupled to the front face of the first driving arm 3. Here, notwithstanding the asymmetry of the articulation structures 10, 11, when the manipulation device 1 is actuated, the gripping portions 6, 7 turn in an opposite direction, moving towards each other.

Figure 10:
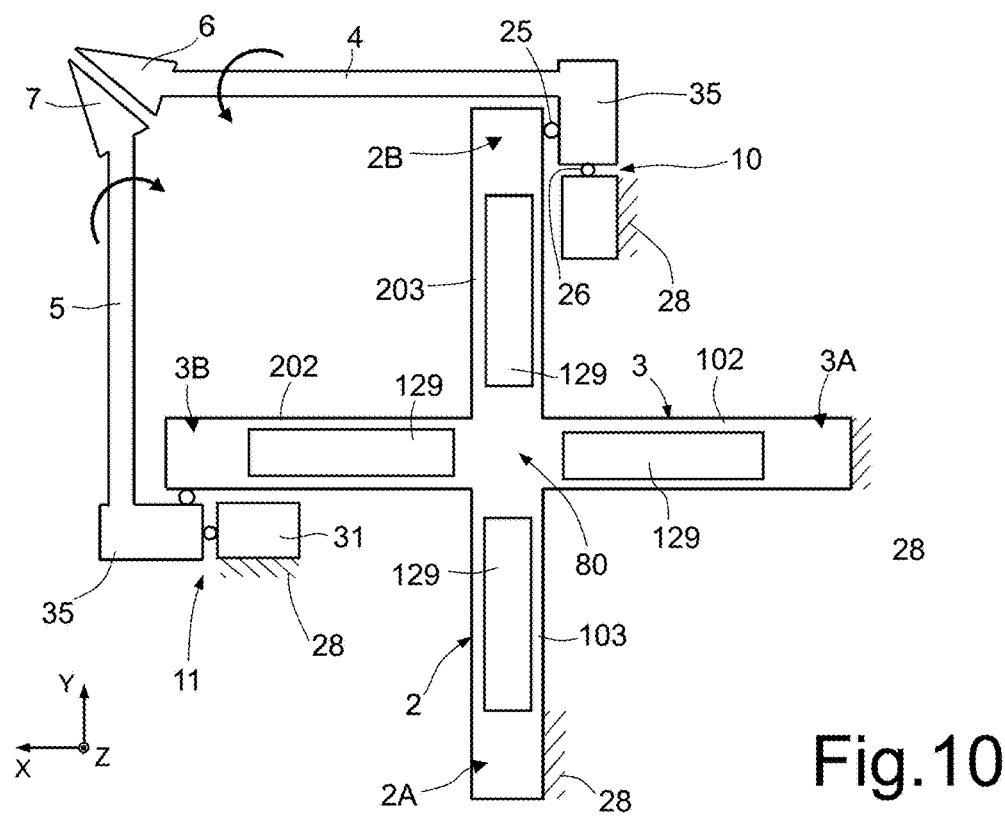

FIG. 10 shows an embodiment of the manipulation device wherein the driving arms 2, 3 are independently actuated. Here, each driving arm 2, 3 is divided into a first part 102, 103, and a second part 202, 203, aligned to each other. In detail, the first parts 102, 103 extend between the respective first ends 2A, 3A, which are connected to the substrate 28 (represented schematically), and a common central area 80 that is cross-shaped. The two second parts 202, 203 extend between the common central area 80 and the respective second ends 2B, 3B. Separate piezoelectric strips 129 extend on the first and second parts 102, 202, 103, 203 of the driving arms 2, 3, and can be driven independently. In this way, it is possible to drive one of the manipulation arms 40, 41 and/or one portion thereof, thus modulating the movement of the gripping portions 6, 7 and/or the force applied thereby.

Figure 11:
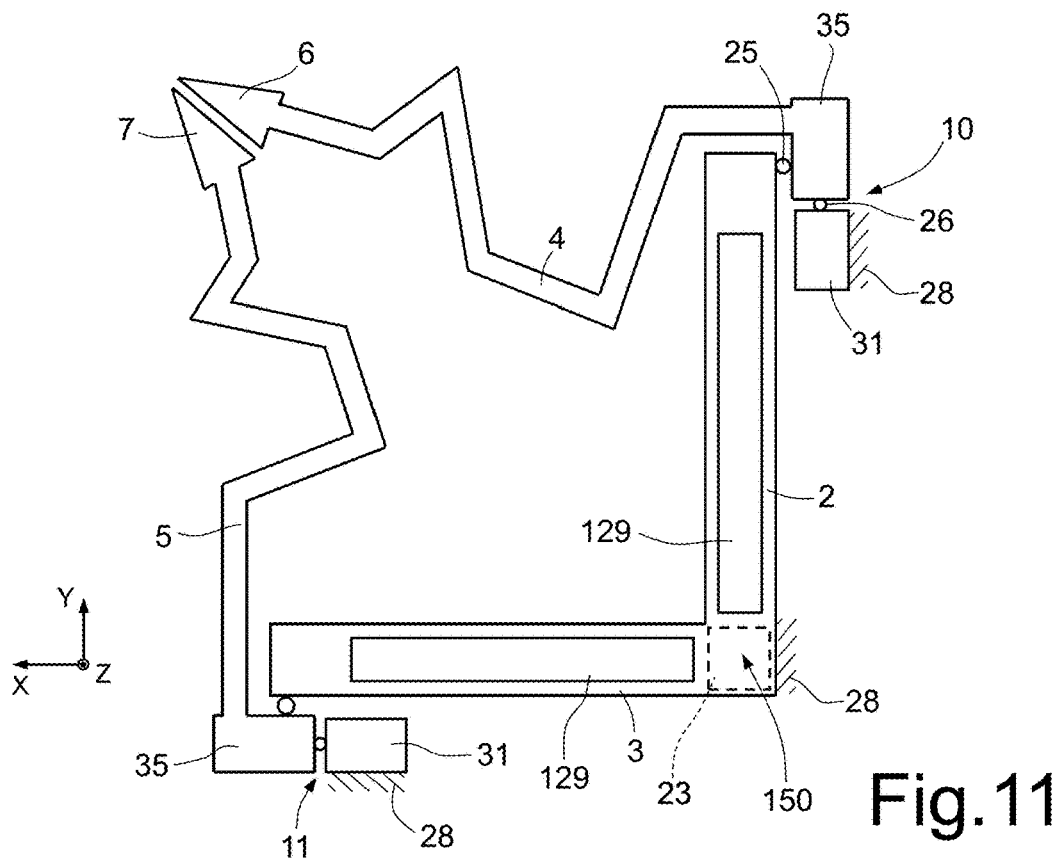

FIG. 11 shows an embodiment of a manipulation device wherein the articulated arms 4, 5 are not rectilinear, but have the shape of broken lines, preferably arranged symmetrically respect to an axis arranged at 45° with respect to axes X and Y of the Cartesian system XYZ.

Moreover, here the driving arms 2, 3 are arranged to form an L and have a first common end 150, connected to the substrate 28 through one first pillar 23 (represented schematically). As an alternative to what illustrated, the driving arms 2, 3 may not have a first common end 150, but separate first ends 2A, 3A, each fixed with respect to a respective first pillar 23.

Also here, the driving arms 2, 3 may be actuated independently, since they have separate piezoelectric strips 129.

This allows the shape of the articulated arms 4, 5 to be adapted to the application, for example, to reduce the overall dimensions so as to avoid obstacles in the movement area of the articulated arms 4, 5 or to meet particular spatial arrangement needs.

Figure 12:
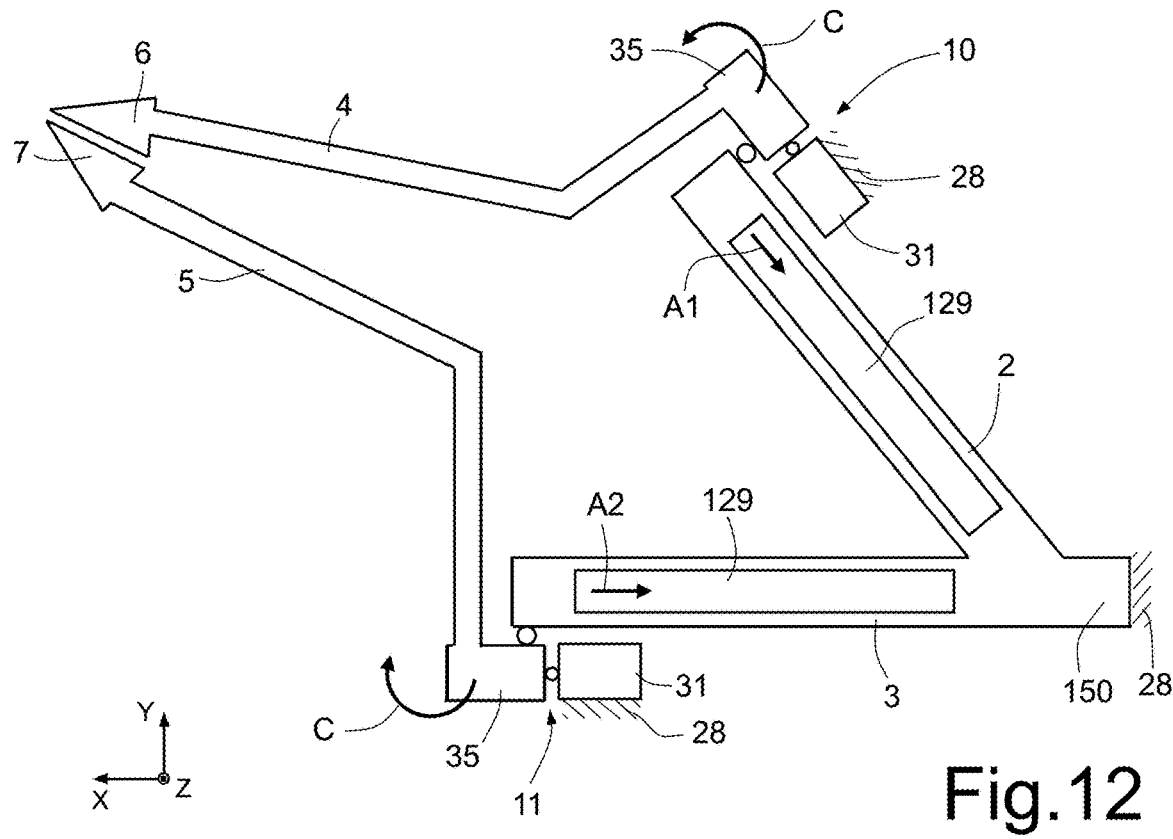

In FIG. 12, the first and second driving arms 2, 3 have a first common end 150, as in FIG. 11, and extend (at rest) with an angle of less than 90°, for example, 45°. Also here, the articulated arms 4, 5 are not rectilinear, but each is formed by two non-aligned stretches, scissor-like, and the driving arms 2, 3 may be independently driven. In particular, the articulated arms 4, 5 are formed by first and second portions 250, 260. The first portions 250 of the articulated arms 4, 5 are articulated to the driving arms 2, 3, respectively, via the hinges 10, 11, respectively, and are substantially perpendicular to the driving arms. The second portions 260 of the articulated arms 4, 5 are inclined with respect to the first portions 250. Moreover, the driving arms 2, 3 may have a first common end 150, as represented, or respective separate first ends 2A, 3A, connected to the substrate 28 through respective first pillars 23, in a way not shown.

In this embodiment, the angle between the driving arms 2, 3 and the shape of the articulated arms 4, 5 may be modified according to the envisaged application so as to optimize the occupied space and the movement of the articulated arms, as well as of the gripping portions 6, 7, according to the design parameters.

Figure 13:
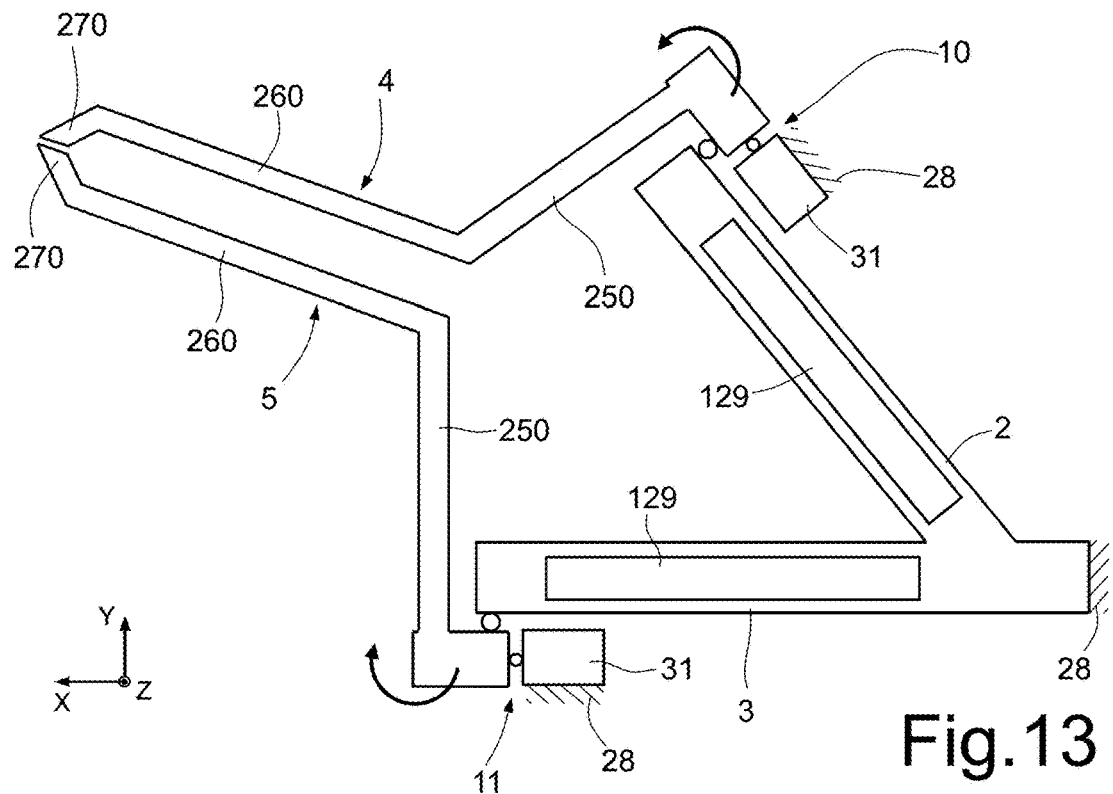

The manipulation device of FIG. 13 is similar to the device of FIG. 12, except that the second portions 260 of the articulated arms 4, 5 extend substantially parallel to each other and end with grippers 270 directed to each other, for holding very small objects and structures.

Figure 14:
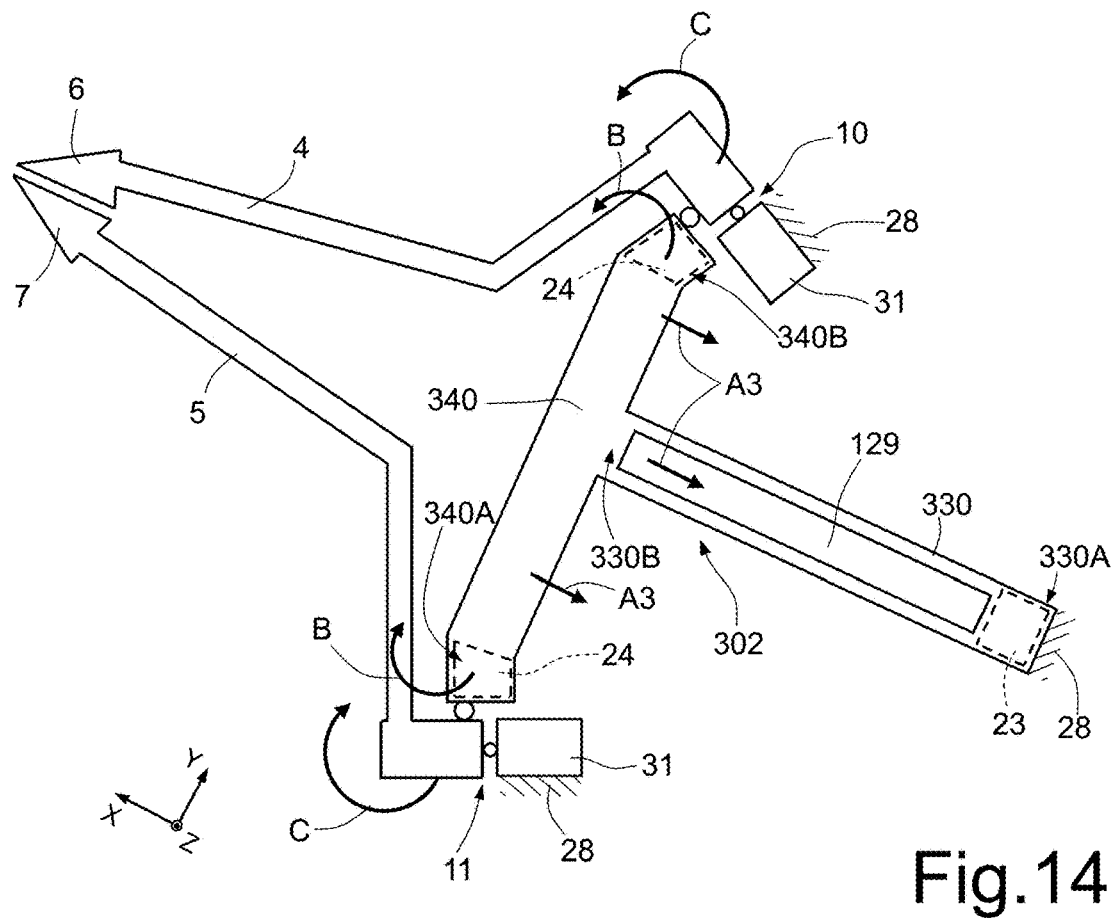

The manipulation device of FIG. 14 has a single driving arm 302 for both the articulated arms 4, 5.

In detail, in FIG. 14 the driving arm 302 is formed by two portions 330, 340 in a T-like arrangement, a first portion 330 whereof being connected to the substrate 28 and a second portion 340 being articulated to the articulated arms 2, 3.

In particular, the first portion 330 is beam shaped and has first and second ends 330A, 330B. The first end 330A of the first portion 330 of the driving arm 302 is connected to the substrate 28 through a first pillar 23, as illustrated in FIG. 6A, and the second end 330B is fixed with respect to a central area of the second portion 340, which thus extends transverse to the first portion 330. A piezoelectric strip 29 extends on the first portion 330 of the driving arm 302.

The second portion 340 of the driving arm 302 has the same thickness as the pillars 23, 24, so as to be rigid, and has two ends 340A, 340B articulated to the articulated arms 4, 5. The ends 340A, 340B of the second portion 340 of the driving arm 302 are shaped substantially like the second end 2B of the driving arm 2 of FIGS. 1-5, are thus fixed with respect to respective second columns 24 (indicated with a dashed line), and are coupled to the articulated arms 4, 5 through the hinges 10 and 11, respectively.

When the piezoelectric strip 129 is biased and shrinks, the second end 330B of the first portion 330 of the driving arm 302 and the second portion 340, fixed to each other, move in the direction of the arrows A3 because of the articulation structures 10, 11 and cause deformation and rotation of the second ends 340A, 340B, according to the arrows B, and rotation of the articulated arms 4, 5 in plane XY, according to the arrows C, as described with reference to FIGS. 4A, 4B.

This provides considerable freedom in designing the shape of the articulated arms 4, 5 on the basis of the design parameters and desires.

Figure 15:
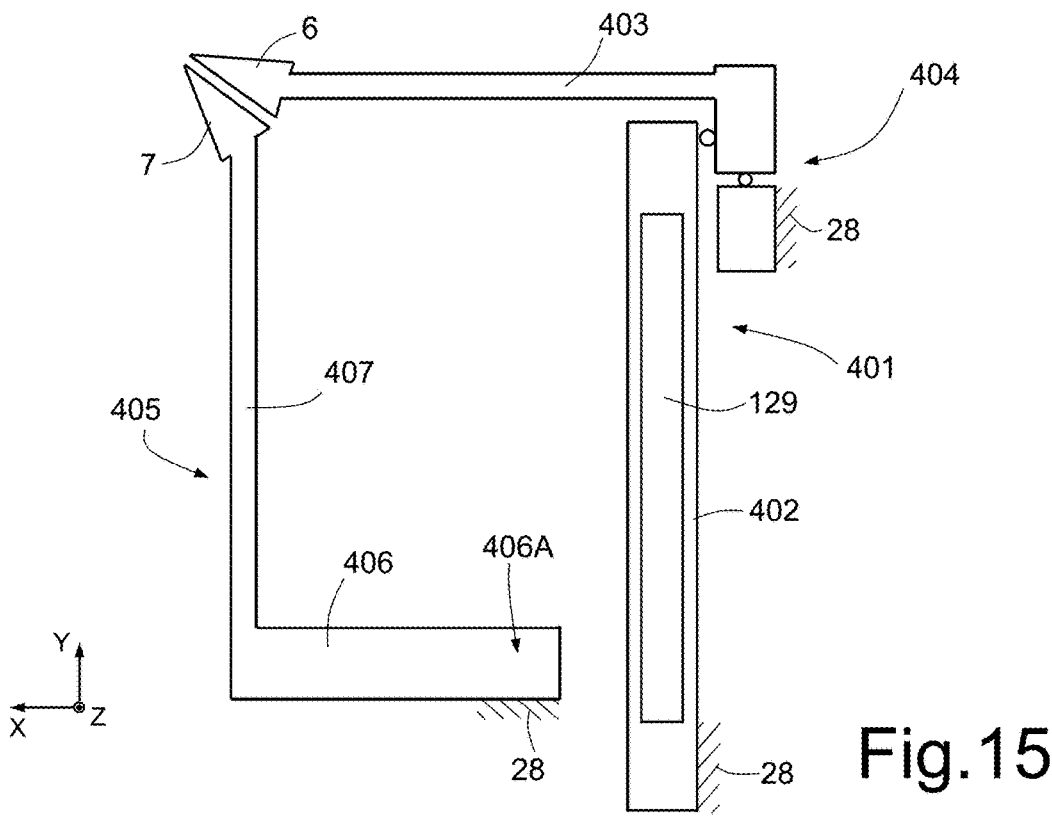

The manipulation device of FIG. 15 has one mobile arm 401, formed by a driving arm 402 and an articulated arm 403, for example, shaped like the first driving arm 2 and the first articulated arm 4 of FIGS. 1-5, and coupled through a constraint structure 404 similar to the articulation structure 11. Moreover, the manipulation device of FIG. 15 has a fixed counter-arm 405. For instance, the counter-arm 405 may comprise a first portion 406 and a second portion 407, formed as suspended beams and arranged at 90° with respect to each other so as to form approximately a quadrilateral with the mobile arm 401. The first portion 406 is here fixed with respect to the substrate 28 via a pillar (not illustrated), similar to the first pillar 23 of FIG. 6 and arranged at one end 406A of the first portion 406 of the counter-arm 405; the rest of the counter-arm 405 may be completely suspended or be connected to the substrate 28 via further pillars. The articulated arm 403 and the second portion 407 of the mobile arm 401 end with gripping ends 6, 7 similar to those represented FIGS. 1-5.

Figure 16:
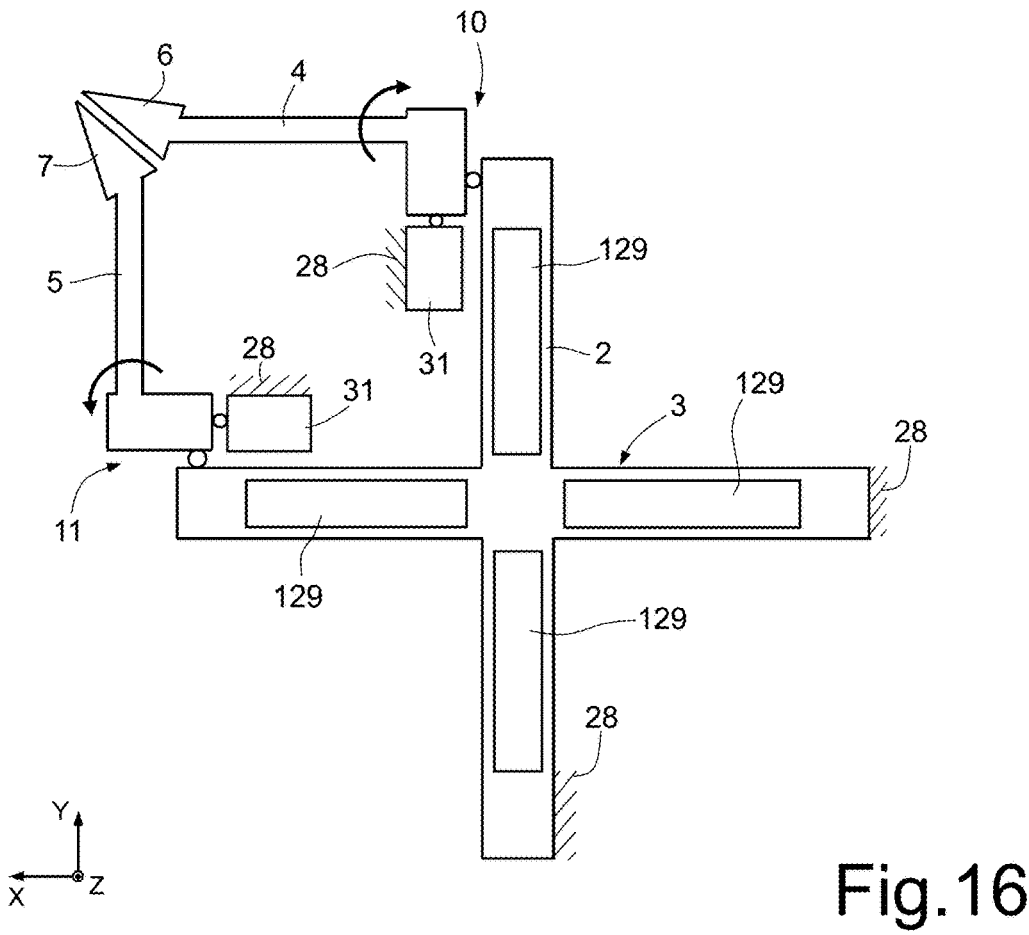

The manipulation device of FIG. 16 operates as divaricator. In fact, the articulation structures 10 and 11 are formed as shown in FIG. 7. Here the driving arms 2, 3 have separate piezoelectric strips 129 and can thus be actuated independently.

Finally, it is clear that modifications and variations may be made to the manipulation device described and illustrated herein, without thereby departing from the scope of this disclosure, as defined in the attached claims. For instance, the different embodiments described may be combined so as to provide further solutions.

In addition, the gripping elements 6, 7 may be arranged at intermediate positions of the articulated arms 4, 5 or a number of gripping elements could be arranged along one of the articulated arms, as, for example, in the embodiment of FIG. 15, if so desired.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A MEMS manipulation device, comprising:
a substrate;
a manipulation structure on the substrate and including a body formed from a structural layer, a supporting layer on the structural layer, and a thin film piezoelectric layer on the supporting layer, the manipulation structure including;
a first manipulation arm; and
a first gripping element carried by the first manipulation arm;
wherein the first manipulation arm comprises a first driving arm and a first articulated arm each having respective first and second ends, the first end of the first driving arm being connected to the substrate and the second end of the first driving arm being articulated to the first end of the first articulated arm through a first articulation structure;
wherein the first driving arm comprises a first beam element formed by the supporting layer and a first piezoelectric region formed by the thin film piezoelectric layer and associated with the first beam element, the first beam element having a main extension extending in an extension plane and a thickness extending in a thickness plane perpendicular to the extension plane, the thickness of the first beam element in the thickness plane being smaller than the extension of main extension in the extension plane, the first and second ends of the first driving arm comprising portions of the supporting layer and portions of the structural layer; and
wherein the first articulation structure comprises a first connecting element and a first hinge structure interposed between the first driving arm, the first articulated arm, and the first connecting element.

2. The MEMS manipulation device according to claim 1, wherein the first connecting element and the first articulated arm are formed by the structural layer and have a thickness greater than the thickness of the first beam element.

3. The MEMS manipulation device according to claim 1, wherein the first connecting element has a wall adjacent to the first beam element and anchored to the substrate.

4. The MEMS manipulation device according to claim 1, wherein the first hinge structure comprises:
a first hinge element arranged between the second end of the first driving arm and the first end of the first articulated arm; and
a second hinge element arranged between the first end of the first articulated arm and the first connecting element;
wherein the first and second hinge elements have respective thicknesses, in the thickness plane, greater than the thickness of the first beam element, and a width in the extension plane smaller than a width of the first driving arm and the first articulated arm.

5. The MEMS manipulation device according to claim 1, wherein the first articulation structure is arranged on a first side of the first beam element, the first articulated arm extends transverse to the first driving arm, the first gripping element is arranged on a second side of the first beam element, and the first end of the first articulated arm has an angled portion extending along the first side of the first beam element and coupled to the first articulation structure.

6. The MEMS manipulation device according to claim 1, wherein the first articulation structure faces a front surface of the second end of the first driving arm, and the first articulated arm extends transversely to the first driving arm.

7. The MEMS manipulation device according to claim 1, wherein the first articulation structure is arranged on a side of the first beam element, and the first articulated arm extends transversely to the first driving arm from the second end of the first driving arm.

8. The MEMS manipulation device according to claim 1, further comprising:
a second manipulation arm; and
a second gripping element carried by the second manipulation arm and facing the first gripping element;
wherein the second gripping element is connected to the substrate and faces the first gripping element.

9. The MEMS manipulation device according to claim 1, further comprising:
a second manipulation arm; and
a second gripping element carried by the second manipulation arm and facing the first gripping element;
wherein the second manipulation arm comprises a second driving arm and a second articulated arm having respective first and second ends, the first end of the second driving arm being connected to the substrate and the second end of the second driving arm being articulated to the first end of the second articulated arm through a second articulation structure;
wherein the second driving arm comprises a second beam element and a second piezoelectric region associated with the second beam element; and
wherein the second articulation structure comprises a second connecting element and a second hinge structure interposed between the second driving arm, the second articulated arm, and the second connecting element.

10. The MEMS manipulation device according to claim 9, wherein the first and second driving arms are arranged crosswise to each other, and the first and second piezoelectric regions are electrically coupled.

11. The MEMS manipulation device according to claim 9, wherein the first and second driving arms are arranged crosswise to each other, and the first and second piezoelectric regions are electrically insulated.

12. The MEMS manipulation device according to claim 9, wherein the first and second articulated arms are perpendicular to the first and second driving arms.

13. The MEMS manipulation device according to claim 9, wherein the first and second articulated arms each comprise a plurality of portions arranged at angles relative to each other to form nonlinear first and second articulated arms.

14. The MEMS manipulation device according to claim 9, wherein the first and second driving arms have a first common end connected to the substrate through a single pillar element extending in the thickness plane.

15. The MEMS manipulation device according to claim 1, further comprising:

a second manipulation arm; and
a second gripping element carried by the second manipulation arm and facing the first gripping element;
wherein the first driving arm is T-shaped and comprises a first portion and a second portion, the first portion of the first driving arm being connected to the substrate at the first end of the first driving arm and the second portion of the first driving arm extending transversely to the first portion of the first driving arm and defining the second end and a third end of the first driving arm;
wherein the second manipulation arm further comprises a second articulated arm and a second articulation structure;
wherein the second articulated arm has a first end and a second end;
wherein the second gripping element is carried by the second end of the second articulated arm and faces the first gripping element; and
wherein the second articulation structure comprises a second connecting element and a second hinge structure, interposed between the third end of the first driving arm, the first end of the second articulated arm, and the second connecting element.

16. The MEMS manipulation device according to claim 1, wherein the first connecting element of the first articulation structure is not deformable in a plane of its thickness.

17. A device comprising:
a substrate;
a monolithic body comprising:
 a first manipulation arm; and
 a first gripping element carried by the first manipulation arm;
wherein the first manipulation arm comprises a first driving arm and a first articulated arm having respective first and second ends,
wherein the first end of the first driving arm is connected to the substrate, and wherein the second end of the first driving arm is articulated to the first end of the first articulated arm through a first articulation structure;
wherein the first driving arm comprises a first beam element and a first piezoelectric region operating on the first beam element, the first beam element having a main extension in a plane of extension, the first beam element having a thickness perpendicular to the plane of extension, the thickness being smaller than the main extension, and
wherein the first articulation structure comprises a first connecting element and a first hinge structure interposed between the first driving arm, the first articulated arm, and the first connecting element.

18. The device according to claim 17, wherein the first articulation structure is arranged on a first side of the first beam element, and the first articulated arm extends transverse to the first driving arm.

19. The device according to claim 17, wherein the first articulation structure faces a front surface of the second end of the first driving arm, and the first articulated arm extends transversely to the first driving arm.

20. The device according to claim 17, further comprising:
a second manipulation arm; and
a second gripping element carried by the second manipulation arm;
wherein the second gripping element faces the first gripping element.

21. The device according to claim 20, wherein the first manipulation arm and the first gripping element are formed of a monolithic layer.

22. A device comprising:
a substrate;
a first manipulation arm; and
a first gripping element carried by the first manipulation arm;
wherein the first manipulation arm comprises a first driving arm and a first articulated arm having respective first and second ends,
the first end of the first driving arm being connected to the substrate and the second end of the first driving arm being articulated to the first end of the first articulated arm through a first articulation structure; and
wherein the first driving arm comprises a first beam element and a first piezoelectric region operating on the first beam element, the first beam element having a main extension in a plane of extension, the first beam element having a thickness perpendicular to the plane of extension, the thickness being smaller than the main extension,
wherein the first articulation structure is arranged on a first side of the first beam element,
wherein the first articulated arm extends transverse to the first driving arm, wherein the first gripping element is arranged on a second side of the first beam element, and
wherein the first end of the first articulated arm has an angled portion extending along the first side of the first beam element and coupled to the first articulation structure.

* * * * *